(12) United States Patent
Pelc et al.

(10) Patent No.: US 10,088,634 B2
(45) Date of Patent: Oct. 2, 2018

(54) OPTICAL PORT-SHUFFLING MODULE

(71) Applicant: HEWLETT PACKARD ENTERPRISE DEVELOPMENT LP, Houston, TX (US)

(72) Inventors: Jason Pelc, Palo Alto, CA (US); Charles M Santori, Palo Alto, CA (US); Marco Fiorentino, Sr., Mountain View, CA (US); Raymond G Beausoleil, Seattle, WA (US); Terrel L Morris, Garland, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/520,847

(22) PCT Filed: Oct. 23, 2014

(86) PCT No.: PCT/US2014/061953
§ 371 (c)(1),
(2) Date: Apr. 21, 2017

(87) PCT Pub. No.: WO2016/064399
PCT Pub. Date: Apr. 28, 2016

(65) Prior Publication Data
US 2017/0336569 A1    Nov. 23, 2017

(51) Int. Cl.
*G02B 6/00* (2006.01)
*G02B 6/35* (2006.01)
(Continued)

(52) U.S. Cl.
CPC ........... *G02B 6/3514* (2013.01); *G02B 6/272* (2013.01); *G02B 6/3516* (2013.01);
(Continued)

(58) Field of Classification Search
CPC .... G02B 6/3514; G02B 6/3516; G02B 6/272; G02B 6/3542; G02B 6/3522; G02B 7/004
See application file for complete search history.

(56) References Cited

U.S. PATENT DOCUMENTS

| 450,412 A | 3/1985 | Carlsen et al. |
| 4,988,157 A * | 1/1991 | Jackel ................. G02B 6/3538 385/17 |

(Continued)

OTHER PUBLICATIONS

Ghafoor, A. et al., Architecture of an All-optical Circuit-switched Multistage Interconnection Network, Oct. 1990, <http://ieeexplore.ieee.org/xpl/articleDetails.jsp?tp=&arnumber=62837&matchBoolean%3Dtrue%26PageNumber%3D2%26searchField%3DSearch_All%26queryText%3D%28%26%28%28%26optic+%29+AND+switch+%29+AND+parsllel*%29+AND+input%29+AND+output%29 > [retrieved on Jul. 30, 2014].

(Continued)

*Primary Examiner* — Ellen Kim
(74) *Attorney, Agent, or Firm* — Tarolli, Sundheim, Covell & Tummino L.L.P.

(57) ABSTRACT

One example includes an optical port-shuffling module. The module includes a plurality of inputs to receive a respective plurality of optical signals. The module also includes a plurality of outputs to provide the respective plurality of optical signals from the optical port-shuffling module. The module further includes a plurality of total-internal-reflection (TIR) mirrors arranged in optical paths of at least a portion of the plurality of optical signals to reflect the at least a portion of the plurality of optical signals to at least a portion of the plurality of outputs to shuffle the plurality of optical signals between the plurality of inputs and the plurality of outputs.

20 Claims, 2 Drawing Sheets

(51) Int. Cl.
  *G02B 7/00* (2006.01)
  *G02B 6/27* (2006.01)
(52) U.S. Cl.
  CPC ......... *G02B 6/3522* (2013.01); *G02B 6/3542* (2013.01); *G02B 7/004* (2013.01)

(56) References Cited

U.S. PATENT DOCUMENTS

| | | | | |
|---|---|---|---|---|
| 5,960,131 A * | 9/1999 | Fouquet | ............... | G02B 6/3538 385/16 |
| 6,055,344 A * | 4/2000 | Fouquet | ............... | G02B 6/3538 385/16 |
| 6,154,586 A * | 11/2000 | MacDonald | ......... | G02B 6/3522 385/18 |
| 6,345,132 B1 * | 2/2002 | Picard | ................. | G02B 6/3538 385/125 |
| 6,356,679 B1 * | 3/2002 | Kapany | ............. | G02B 6/29368 385/17 |
| 6,366,715 B1 | 4/2002 | Wang et al. | | |
| 6,396,972 B1 * | 5/2002 | O'Rourke | ............ | G02B 6/3538 385/17 |
| 6,463,192 B1 | 10/2002 | Kapany | | |
| 6,487,333 B2 * | 11/2002 | Fouquet | ............... | G02B 6/3536 385/16 |
| 6,711,315 B1 | 3/2004 | Joseph et al. | | |
| 6,768,830 B1 * | 7/2004 | Lacey | ................. | G02B 6/3538 385/15 |
| 6,895,139 B2 * | 5/2005 | Schwiebert | .......... | G02B 6/3538 385/16 |
| 6,915,032 B1 | 7/2005 | White et al. | | |
| 7,653,272 B2 | 1/2010 | Cham et al. | | |
| 8,195,016 B2 * | 6/2012 | Shacklette | ........... | G02B 6/3506 29/428 |
| 2003/0002030 A1 * | 1/2003 | Schroeder | ............ | G02B 6/3538 356/73.1 |
| 2009/0002849 A1 | 1/2009 | Kim et al. | | |
| 2014/0193116 A1 | 7/2014 | Bylander et al. | | |

OTHER PUBLICATIONS

PCT/ISA/KR, International Search Report, dated Jun. 30, 2015, PCT/US2014/061953.

* cited by examiner

OPTICAL PORT-SHUFFLING MODULE

BACKGROUND

Optical communications have become more prevalent as the demand for high-speed communication and processing has increased. Optical communications typically implement a laser and/or other optical devices for providing and receiving optical signals. Datacenter networks typically require the linking of optical cables (e.g., optical fibers) between optical devices, with the number of cables being potentially be very large (e.g., numbering in the thousands). Such an arrangement of a large number of optical cables can require optical shuffling to re-order a linear array of optical cables between input and output planes of a given computer or optical system.

DETAILED DESCRIPTION

Figure 1:
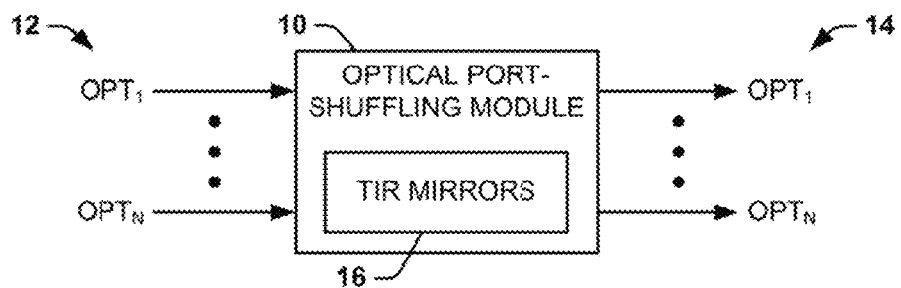
FIG. 1 illustrates an example of an optical port-shuffling system.

FIG. 1 illustrates an example of an optical port-shuffling module 10. The optical port-shuffling module 10 can be configured in any of a variety of optical communications and computer applications that require optical signal transfer. The optical port-shuffling module 10 is configured to receive a plurality N of optical signals, demonstrated in the example of FIG. 1 as optical signals $OPT_1$ through $OPT_N$, where N is a positive integer, at a respective plurality of inputs 12. The optical port-shuffling module 10 can thus provide the optical signals $OPT_1$ through $OPT_N$ at a respective plurality of outputs 14, such as to provide optical shuffling of the optical signals $OPT_1$ through $OPT_N$. As described herein, the term "optical shuffling" refers to changing an arrangement (e.g., an order) in an array (e.g., a linear array) of the optical signals $OPT_1$ through $OPT_N$ between the plurality of inputs 12 and the plurality of outputs 14.

In the example of FIG. 1, the optical port-shuffling module 10 includes a plurality of total-internal-reflection (TIR) mirrors 16. As an example, the TIR mirrors 16 can be disposed in a body portion of the optical port-shuffling module 10, such as composed of an optically transmissive material through which the optical signals $OPT_1$ through $OPT_N$ propagate in the optical port-shuffling module 10. For example, the body portion can be formed of a monolithic (e.g., integral) structure of the optically transmissive material. Therefore, the TIR mirrors 16 can have a refractive index that is less than a refractive index of the optically transmissive material from which the body portion is fabricated. As an example, the optically transmissive material can be a molded plastic material, and the TIR mirrors 16 can be formed from a medium having a refractive index that is less than the molded plastic material (e.g., air). Therefore, based on the relative refractive index of the optically transmissive material and the TIR mirrors 16, the TIR mirrors 16 can be configured to reflect at least a portion of the optical signals $OPT_1$ through $OPT_N$ between the inputs 12 and the outputs 14 to provide the optical shuffling of the optical signals $OPT_1$ through $OPT_N$.

As an example, the TIR mirrors 16 can be arranged at 45° angles relative to the inputs 12 and the outputs 14 in the respective optical paths of the optical signals $OPT_1$ through $OPT_N$. Therefore, the optical signals $OPT_1$ through $OPT_N$ can be reflected between the inputs 12 and the outputs 14 arranged orthogonally with respect to each other (e.g., along adjacent sides of the body portion). For example, the TIR mirrors 16 can have a quantity N that is equal to the quantity of the optical signals $OPT_1$ through $OPT_N$, such that the TIR mirrors 16 can reflect all of the optical signals $OPT_1$ through $OPT_N$. As another example, the TIR mirrors 16 can have a quantity that is less than the quantity of the optical signals $OPT_1$ through $OPT_N$ (e.g., the number of TIR mirrors 16 can be less than N). In this configuration, each of the TIR mirrors 16 can reflect a respective one of the optical signals $OPT_1$ through $OPT_N$, such that the remaining optical signals $OPT_1$ through $OPT_N$ are provided directly through the optical port-shuffling module 10 without reflection. Additionally, the optical shuffling that is provided by the TIR mirrors 16 in the optical port-shuffling module 10 can be such that any or all of the optical signals $OPT_1$ through $OPT_N$ can be shuffled between the inputs 12 and the outputs 14 to change the arrangement (e.g., order) of the optical signals $OPT_1$ through $OPT_N$ between the inputs 12 and the outputs 14.

As described herein, the optical port-shuffling module 10 can provide a very low cost and very highly-scalable optical shuffling solution. As described previously, the optical port-shuffling module 10 can be formed as a monolithic structure from an optically transmissive material (e.g., molded plastic) and implements the TIR mirrors 16, which could be shaped cavities, such as pockets (e.g., rectangular prism having an opening along one surface and sold sidewalls along the other surfaces thereof). Each of the cavities can contain a fluid material (e.g., air, water, or the like) having an appropriate index of refraction to reflect the optical signals $OPT_1$ through $OPT_N$ to the designated outputs. Each of the shaped pockets can have the same or different fluids to provide for reflection or transmission of the respective signals.

Therefore, the optical port-shuffling module 10 can be fabricated using a variety of injection molding techniques that can provide for a very rapid and very inexpensive manner of mass producing a large quantity of optical port-shuffling modules 10. Additionally, because the optical port-shuffling module 10 implements the TIR mirrors 16 to provide reflection of the optical signals $OPT_1$ through $OPT_N$, the optical port-shuffling module 10 can be very inexpensive based on a lack of a requirement to fabricate mirrored surfaces (e.g., sputtered metal or distributed Bragg reflection (DBR) mirrors) within the body of the optical port-shuffling module 10. Furthermore, based on the simplicity and inexpensive manner of fabricating the optical port-shuffling module 10, the quantity N of the optical signals $OPT_1$ through $OPT_N$ can be sufficiently large to provide for optical routing in large optical computing systems.

Figure 2:
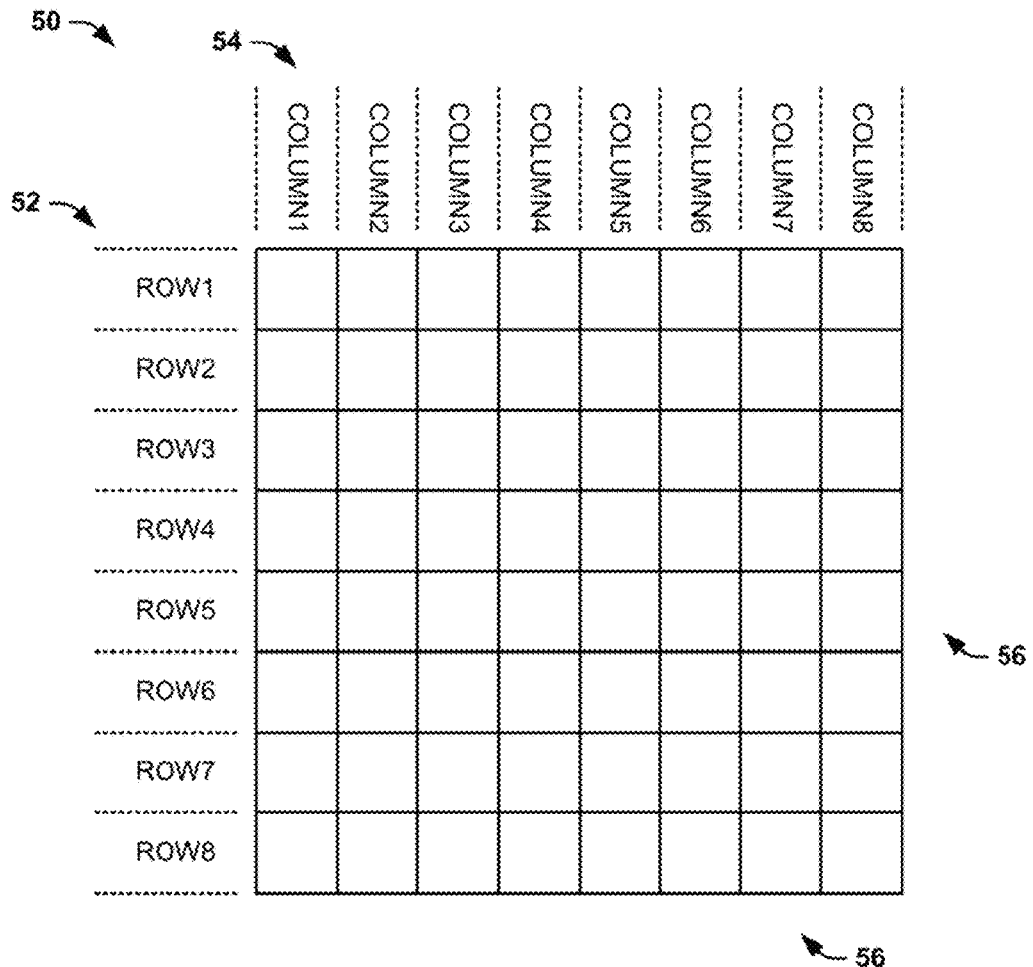
FIG. 2 illustrates an example of an array of potential mirror locations in an optical port-shuffling module.

FIG. 2 illustrates an example of an array 50. The array 50 corresponds to potential mirror locations in an optical port-shuffling module, such as the optical port-shuffling module 10. Therefore, reference is to be made to the example of FIG. 1 in the following description of the example of FIG. 2.

The array 50 can correspond to a body portion of the optical port-shuffling module 10, such as including the TIR mirrors 16 (e.g., without the inputs 12 and the outputs 14 being shown). The array 50 includes a plurality of rows 52, demonstrated as eight separate rows in the example of FIG. 2, and a plurality of columns 54, demonstrated as eight separate columns in the example of FIG. 2. The array 50 also includes a plurality of cells 56 corresponding to the intersections of each of the rows 52 with each of the columns 54. Thus, the array 50 includes a two-dimensional matrix of sixty-four cells 56 in the example of FIG. 2. However, it is to be understood that the array 50 could include more or less rows 52 and columns 54 to provide the cells 56, and that the array 50 is not limited to having an equal number of rows 52 and columns 54. As another example, the array having an unequal number of rows 52 and columns 54 can be implemented to fabricate an optical port-shuffling module 10 that includes more than one TIR mirror 16 in an optical path of a given one of the optical signals $OPT_1$ through $OPT_N$.

Each of the cells 56 can correspond to a potential location of a TIR mirror, such as one of the TIR mirrors 16 in the example of FIG. 1. As an example, during fabrication of the optical port-shuffling module 10, an optical shuffling scheme can be determined with respect to the changing of the arrangement or linear order of the inputs 12 relative to the outputs 16. Therefore, the locations of the TIR mirrors 16 can be determined with respect to the cells 56 in the array 50. Therefore, based on placement of a given TIR mirror 16 in a cell 56, an optical signal can be reflected between the corresponding one of the rows 52 and the corresponding one of the columns 54. Similarly, a given one of the rows 52 or the columns 54 can be left without a TIR mirror 16, such as to provide a direct pass-through of the respective optical signal through the optical port-shuffling module 10.

As described previously, the optical port-shuffling module 10 can be formed from an optically transmissive material, such as a molded plastic material via an injection molding process. Therefore, as an example, upon determining the location of the TIR mirrors 16 with respect to the cells 56 in the array, a mold template can be formed that includes casting structures corresponding to the TIR mirrors 16. The mold template can be implemented in the injection molding process to form the optical port-shuffling module 10 with the TIR mirrors 16 in the respective cells 56 corresponding to the optical paths of the optical signals $OPT_1$ through $OPT_N$ with respect to the inputs 12 and the outputs 14. As an example, the injection molding process can be implemented in a variety of ways, such as an over-molding process, an inter-molding process, a channel-forming process, and/or a low-pressure molding process to provide the optically transmissive material, such as the molded plastic material, into the mold template to form the optical port-shuffling module 10. Therefore, upon removal of the mold template, the optical port-shuffling module 10 can be provided with the TIR mirrors 16 formed in the appropriate locations corresponding to the casting structures in the respective cells 56.

As another example, the optical port-shuffling module 10 can be formed by providing a casting structure in each of the cells 56 during the injection molding process. Therefore, upon completion of the molding process, the optical port-shuffling module 10 can initially include cavities in each of the cells 56 that could correspond to a TIR mirror 16. The optical port-shuffling module 10, at that stage, can thus be selectively modified to provide the TIR mirrors 16 in the appropriate optical paths of the optical signals $OPT_1$ through $OPT_N$ by inserting an index-matching material, such as another fluid, that has a refractive index that is approximately equal to the optically transmissive material forming the body portion of the optical port-shuffling module 10. For example, the cavities can be selectively filled with the index-matching material to disable the cavity from being a TIR mirror 16, and thus disable the respective TIR mirror 16. Therefore, the locations of the TIR mirrors 16 of the optical port-shuffling module 10 can be selectively determined after the injection molding process in a simple and inexpensive manner (e.g., by using different fluid materials in selected cavities.

The optically transmissive material can be any of a variety of materials that can be optically transmissive to wavelengths of interest corresponding to the optical signals $OPT_1$ through $OPT_N$. Therefore, the optical port-shuffling module can provide the optical port-shuffling capability while being substantially insensitive to frequency and/or polarization of the optical signals $OPT_1$ through $OPT_N$. While the optically transmissive material is described herein by example as a molded plastic material, it is to be understood that a variety of other optically transmissive materials can be implemented in fabricating the optical port-shuffling module 10. For example, the optically transmissive material can comprise glass, silicon, or any of a variety of other materials through which the optical signals $OPT_1$ through $OPT_N$ can propagate and which has a sufficiently high refractive index (e.g., higher than the fluid in the cavities used to provide the TIR mirrors). Additionally, while the TIR mirrors 16 have been described herein as shaped air gaps, it is to be understood that other fluid or solid media having a refractive index that is less than the optically transmissive material can be implemented. For example, the optical port-shuffling module 10 can be fabricated based on the injection molding process, as described previously, and each of the TIR mirrors 16 can be formed by filling the gaps left by the casting structures with a material having a lower refractive index than the optically transmissive material.

Furthermore, the inputs 12 and the outputs 14 can also be formed as part of the body portion of the optical port-shuffling module 10. As one example, the inputs 12 and the outputs 14 can correspond to mechanical optical connectors into which optical fibers can be plugged or to which optical fibers can be spliced. Thus, the body portion can be fabricated (e.g., by machining) to include optical couplers to which the inputs 12 and the outputs 14 can be coupled. As another example, the inputs 12 and the outputs 14 can be molded onto the body portion during the molding process. For example, the inputs 12 and the outputs 14 can be molded in alignment with the optical paths of the optical signals $OPT_1$ through $OPT_N$ by the integral material (e.g., the molded plastic material) during the associated molding process. As yet another example, the inputs 12 and the outputs 14 correspond to a periphery of the integral material (e.g., the molded plastic) into which and from which the optical signals $OPT_1$ through $OPT_N$ are provided. For example, optical fibers associated with the inputs 12 and the outputs 14 can be separate from the body portion of the optical port-shuffling module 10, such that the optical port-shuffling module 10 can be snapped into a fitted bracket that is substantially flush with the separate inputs 12 and outputs 14 to provide the optical signals $OPT_1$ through $OPT_N$ directly to and from the periphery of the body portion of the optical port-shuffling module 10. Thus, the optical port-shuffling module 10 can be fabricated to receive the optical signals $OPT_1$ through $OPT_N$ via the inputs 12 and provide the optical signals $OPT_1$ through $OPT_N$ via the outputs 14 in a variety of ways.

Figure 3:
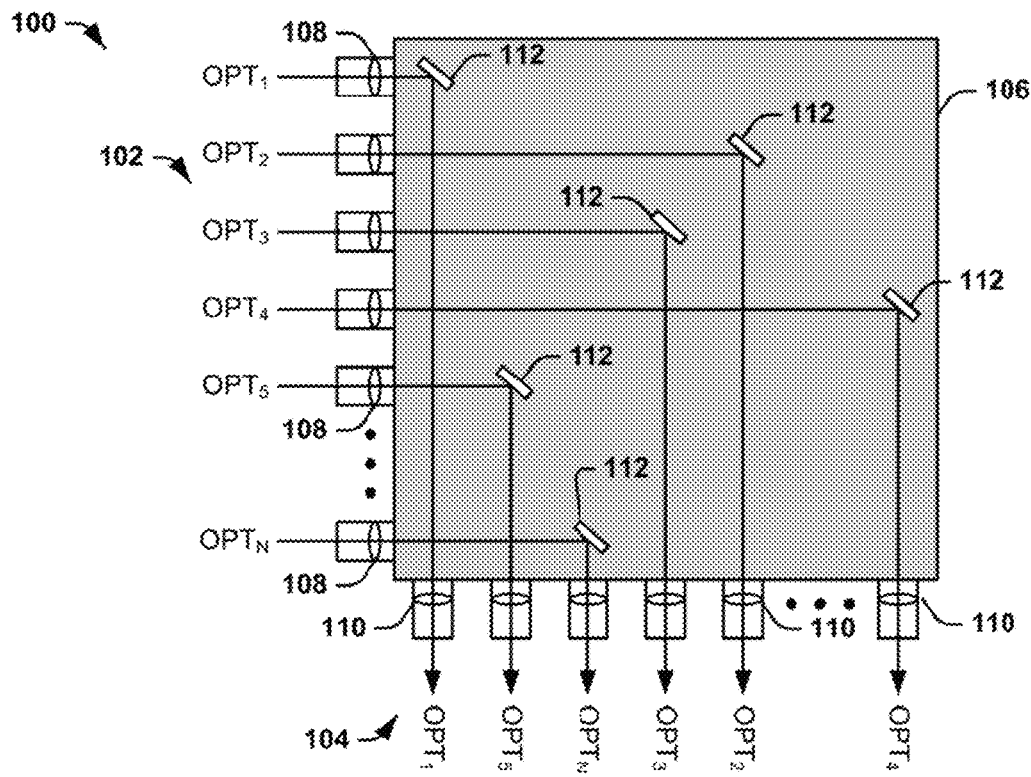
FIG. 3 illustrates another example of an optical port-shuffling system.

FIG. 3 illustrates another example of an optical port-shuffling system 100. Similar to as described previously in the example of FIG. 1, the optical port-shuffling module 100 is configured to receive a plurality N of optical signals, demonstrated in the example of FIG. 3 as optical signals OPT₁ through OPT_N, where N is a positive integer, at a respective plurality of inputs 102. The optical port-shuffling module 100 can thus provide the optical signals OPT₁ through OPT_N at a respective plurality of outputs 104, such as to provide optical shuffling of the optical signals OPT₁ through OPT_N. In the example of FIG. 3, the optical port-shuffling module 100 includes a three-dimensional body portion 106 that can be formed as a monolithic (e.g., integral) structure from an optically transmissive material (e.g., a molded plastic material), such as during a molding process (e.g., substantially similar to as described in the example of FIG. 2). The optical signals OPT₁ through OPT_N propagate through the body portion 106 between the inputs 102 and the outputs 104.

In the example of FIG. 3, the inputs 102 each include a beam collimator 108 to collimate the optical signals OPT₁ through OPT_N that are provided into the body portion 106 via the inputs 102. Similarly, the outputs 104 each include a beam collimator 110 to collimate the optical signals OPT₁ through OPT_N that are provided from the body portion 106 via the outputs 104. As an example, the beam collimators 108 and 110 can be part of the respective inputs 102 and outputs 104 configured as mechanical connectors. As another example, the beam collimators 108 and 110 can be formed as part of the body portion 106 (e.g., at the periphery of the body portion 106), or can be provided between the body portion 106 and the inputs 102 and the outputs 104. Thus, based on the beam collimators 108, divergence of the optical signals OPT₁ through OPT_N through the body portion is substantially mitigated. Similarly, based on the beam collimators 110, divergence of the output optical signals OPT₁ through OPT_N provided from the body portion 106 is substantially mitigated.

The optical port-shuffling module 100 also includes a plurality of TIR mirrors 112 that are disposed in the body portion 106 in the optical paths of the optical signals OPT₁ through OPT_N to reflect the optical signals OPT₁ through OPT_N between the inputs 102 and the outputs 104. The TIR mirrors 112 have a refractive index that is less than a refractive index of the integral material from which the body portion 106 is fabricated to provide the reflection of the optical signals OPT₁ through OPT_N. As an example, the TIR mirrors 112 can correspond to shaped air pockets (e.g., cavities) in the integral material of the body portion 106. In the example of FIG. 3, the TIR mirrors 112 are demonstrated as including an incident substantially planar surface arranged at 45° angles relative to the inputs 102 and the outputs 104 in the respective optical paths of the optical signals OPT₁ through OPT_N. Therefore, the optical signals OPT₁ through OPT_N are reflected between the inputs 102 and the outputs 104 arranged orthogonally with respect to each other. Additionally, it is to be understood that other angles and shapes of surfaces can be utilized to provide the TIR mirrors 112. Furthermore, the geometry of the optical port-shuffling module 100 is not limited to being square or rectangular, but the optical port-shuffling module 100 could instead include any of a variety of other geometries to accommodate other angles of the TIR mirrors 112 between the inputs 102 and outputs 104.

In the example of FIG. 3, the optical signal OPT₁ received at a first of the inputs 102 is reflected by a first of the TIR mirrors 112 to provide the optical signal OPT₁ at a first of the outputs 104. The optical signal OPT₂ received at a second of the inputs 102 is reflected by a second of the TIR mirrors 112 to provide the optical signal OPT₅ at a fifth of the outputs 104. The optical signal OPT₃ received at a third of the inputs 102 is reflected by a third of the TIR mirrors 112 to provide the optical signal OPT₄ at a fourth of the outputs 104. The optical signal OPT₄ received at a fourth of the inputs 102 is reflected by a fourth of the TIR mirrors 112 to provide the optical signal OPT_N at an Nth of the outputs 104. The optical signal OPT₅ received at a fifth of the inputs 102 is reflected by a fifth of the TIR mirrors 112 to provide the optical signal OPT₂ at a second of the outputs 104. And lastly, the optical signal OPT_N received at an Nth of the Inputs 102 is reflected by an Nth of the TIR mirrors 112 to provide the optical signal OPT₃ at a third of the outputs 104. Therefore, in the example of FIG. 3, the optical port-shuffling module 100 provides a predetermined optical shuffling of the optical signals OPT₁ through OPT_N between the inputs 102 and the outputs 104. Any arrangement of the TIR mirrors 112 can be implemented to provide different predetermined optical shuffling of optical signals OPT₁ through OPT_N.

Figure 4:
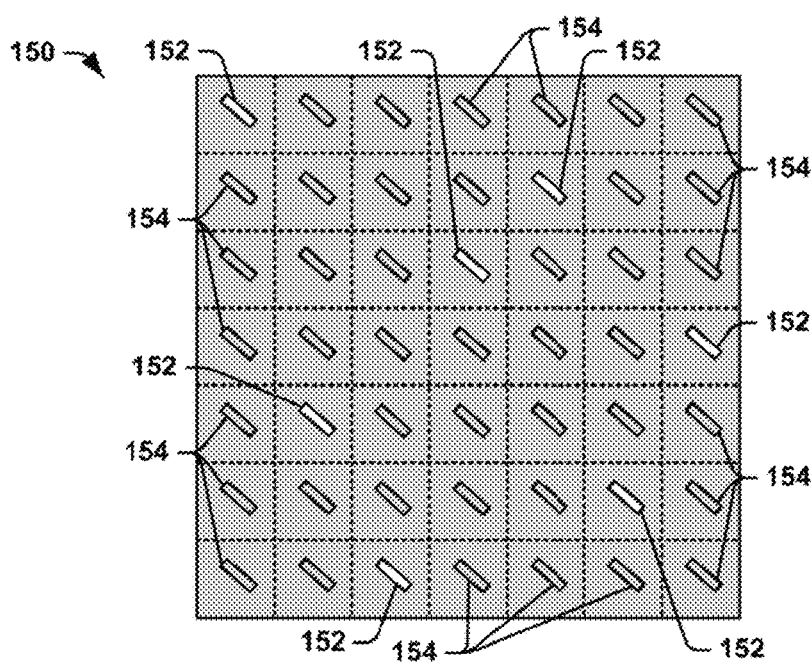
FIG. 4 illustrates yet another example of an optical port-shuffling system.

FIG. 4 illustrates an example of a body portion 150 of an optical port-shuffling system. The body portion 150 that can be formed from an optically transmissive material (e.g., a molded plastic material), such as during a molding process (e.g., substantially similar to as described in the example of FIG. 2). Optical signals (e.g., the optical signals OPT₁ through OPT_N) can propagate through the body portion 150 between inputs and outputs (e.g., the inputs 152 and the outputs 154). The body portion 150 includes a plurality of TIR mirrors 152, similar to as described previously.

In the example of FIG. 4 and with reference to the example of FIG. 2, the body portion 150 can have been fabricated such that every cell 56 in the two-dimensional array 50 included a casting structure in the template to provide a respective cavity, and thus has the ability to operate as a TIR mirror 152, in every cell 56. For instance, each of the cavities, as formed, includes a volume of air therein, which has an index of refraction that is lower than the optically transmissive material. Subsequent to fabrication of the body portion 150, the cavities that were not designated to be TIR mirrors 152 in the finished optical port-shuffling module that includes the body portion 150 can be filled with an index-matching material (e.g., having a refractive index approximately equal to the integral material of the body portion 150). In the example of FIG. 4, the index-matching material-filled gaps are demonstrated at 154, and correspond to every cavity (at least those in the optical path between the inputs and designated TIR mirrors 152) that was not designated to be a TIR mirror 152. As a result, only the TIR mirrors 152 remain to provide reflection of the optical signals (e.g., the optical signals OPT₁ through OPT_N) between inputs and outputs to provide a substantially similar optical shuffling demonstrated in the example of FIG. 3 for an N=7 configuration (e.g., with the sixth input providing a sixth optical signal OPT₆ at a sixth output).

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An optical port-shuffling module comprising:
a plurality of inputs to receive a respective plurality of optical signals;

a plurality of outputs to provide the respective plurality of optical signals from the optical port-shuffling module; and a body portion comprising an optically transmissive material and having an array of cavities comprised of an optically transmissive material, the array provided in a predetermined configuration to include:
  optically transmissive elements having cavities filled with a fixed fluid having a refractive index matching the refractive index of the transmissive material; and
  optically reflective elements having cavities filled with a fixed fluid material having a refractive index less than the refractive index of the transmissive material,
  wherein the cavities are arranged in optical paths of at least a portion of the plurality of optical signals to reflect the at least a portion of the plurality of optical signals to at least a portion of the plurality of outputs to shuffle the plurality of optical signals between the plurality of inputs and the plurality of outputs.

2. The module of claim 1, wherein the body portion is formed to comprise a two-dimensional array of cavities.

3. The module of claim 1, wherein the plurality of inputs and the plurality of outputs correspond to a periphery of the body portion in which the plurality of optical signals are provided.

4. The module of claim 1, further comprising a plurality of beam collimators to interconnect the body portion and each of the plurality of inputs and outputs.

5. The module of claim 1, wherein the optically transmissive material is a molded plastic material having a refractive index that is greater than a medium associated with the reflective elements.

6. The module of claim 5, wherein the plurality of inputs and outputs are arranged as mechanical optical connectors that are molded in alignment with the optical paths of the plurality of optical signals by the molded plastic material.

7. The module of claim 1, wherein the plurality of inputs and the plurality of outputs each comprise a beam collimator to collimate the plurality of optical signals at each of the plurality of inputs and the plurality of outputs.

8. An optical port-shuffling module comprising:
  a plurality of inputs to receive a respective plurality of optical signals;
  a plurality of outputs to provide the respective plurality of optical signals from the optical port-shuffling module; and
  a body portion comprising an optically transmissive material through which the plurality of optical signals propagate, according to a predetermined configuration, in respective plurality of optical paths between the plurality of inputs and the plurality of outputs, the body portion further comprising a first portion of cavities filled with a first fixed fluid material having a refractive index matching a refractive index of the optically transmissive material, and a second portion of cavities filled with a second, different fixed fluid material having a refractive index less than the refractive index of the optically transmissive material, the second portion of cavities forming a plurality of total-internal-reflection (TIR) mirrors arranged in the plurality of optical paths of at least a portion of the plurality of optical signals to reflect the at least a portion of the plurality of optical signals to at least a portion of the plurality of outputs to shuffle the plurality of optical signals between the plurality of inputs and the plurality of outputs.

9. The module of claim 1, wherein the body portion is formed by providing a casting structure in each of an array of cells to form the cavities during an injection molding process.

10. The module of claim 8, wherein the body portion is formed by providing a casting structure in each of an array of cells to form the cavities during an injection molding process.

11. The module of claim 8, wherein the body portion comprises a plurality of beam collimators to interconnect the optically transmissive material and each of the plurality of inputs and outputs.

12. The module of claim 8, wherein the optically transmissive material is a molded plastic material.

13. The module of claim 12, wherein the plurality of inputs and outputs are arranged as optical ports that are molded in alignment with the optical paths of the plurality of optical signals by the molded plastic material during an associated molding process.

14. The module of claim 8, wherein the plurality of inputs and the plurality of outputs each comprise a beam collimator to collimate the plurality of optical signals at each of the plurality of inputs and the plurality of outputs.

15. A method of manufacturing an optical port-shuffling module comprising:
  determining a location of a plurality of total-internal-reflection (TIR) mirrors to be disposed in a monolithic, optically transmissive material, the TIR mirrors to reflect at least a portion of a plurality of optical signals from a plurality of inputs to at least a portion of a plurality of outputs;
  forming a mold template including a casting structure having an array of shaped cavities filled with a first fluid having a first index of refraction, the array of shaped cavities corresponding to the determined location of the TIR mirrors;
  injecting the optically transmissive material into the casting structure; and
  selectively replacing the first fluid, according to a predetermined configuration, in at least one of the array of shaped cavities with a second fluid having a second index of refraction to disable the cavity from being a TIR mirror, wherein the first fluid in at least one of the array of shaped cavities is selectively replaced to shuffle the plurality of optical signals between the plurality of inputs and the plurality of outputs.

16. The method of claim 15, wherein the optically transmissive material is injected into the casting structure by an over-molding process, an inter-molding process, a channel-forming process, or a low-pressure molding process.

17. The method of claim 15, wherein the second fluid has an index of refraction that matches that of the optically transmissive material and is greater than the index of refraction of the first fluid.

18. The method of claim 15, wherein the first fluid is air, and the air in at least one of the array of shaped cavities is selectively replaced by filling the cavity with the second fluid.

19. The method of claim 15, wherein the optical-port shuffling module is manufactured to include optical couplers to couple the inputs and the outputs.

20. The method of claim 15, further comprising securing the optical port-shuffling module into a fitted bracket that is flush with the inputs and outputs to provide the optical signals directly to and from the optical port-shuffling module.

* * * * *